United States Patent [19]
Dyer et al.

[11] Patent Number: 5,448,882
[45] Date of Patent: Sep. 12, 1995

[54] FUEL METERING SYSTEM

[75] Inventors: Gerald P. Dyer, Enfield; Brian G. Donnelly, Suffield, both of Conn.

[73] Assignee: United Technologies Corporation, Hartford, Conn.

[21] Appl. No.: 166,685

[22] Filed: Dec. 14, 1993

[51] Int. Cl.[6] ............................................. F02C 9/26
[52] U.S. Cl. ............................................. 60/39.281
[58] Field of Search ............... 60/39.281, 739, 740, 60/746, 747

[56] References Cited

U.S. PATENT DOCUMENTS

| | | | |
|---|---|---|---|
| 4,134,259 | 1/1979 | Gardner et al. | 60/39.281 |
| 4,449,548 | 5/1984 | Tutherly | 137/468 |
| 4,612,616 | 9/1986 | Binns et al. | 60/39.281 |
| 4,718,229 | 1/1988 | Riley | 60/39.281 |
| 4,949,538 | 8/1990 | Iasillo et al. | 60/39.4655 |
| 5,114,115 | 5/1992 | Gillott | 251/26 |
| 5,257,496 | 11/1993 | Brown et al. | 60/39.281 |

*Primary Examiner*—Louis J. Casaregola
*Attorney, Agent, or Firm*—McCormick, Paulding & Huber

[57] ABSTRACT

A fuel control system independently meters fuel flow to a first and a second set of pilot fuel nozzles, and to a set of main fuel nozzles. A pilot coaxial metering and pressure regulating valve is coupled between a primary fuel inlet line and the first and second sets of pilot nozzles, and a main coaxial metering and pressure regulating valve is coupled between the primary fuel inlet line and the set of main fuel nozzles. Each coaxial metering and pressure regulating valve maintains a substantially constant pressure drop across the respective valve, and includes a metering window. The size of each metering window is controlled by an engine electronic control unit based on the signals transmitted by a respective LVDT, in order to precisely meter the fuel flow through the valve and to the respective sets of fuel nozzles. A control pressure regulating valve maintains a minimum pressure differential between the fuel inlet line and the downstream sides of the coaxial metering and pressure regulating valves, in order to provide sufficient pressure to operate the valves, and directs excess fuel from the fuel pump into a return line. A minimum pressure and shut-off valve is coupled between each coaxial metering and pressure regulating valve and the respective fuel nozzles, in order to maintain a minimum fuel pressure level, and to terminate fuel flow to the nozzles. A sequence valve is coupled to the minimum pressure and shut-off valves to control actuation of the valves.

23 Claims, 2 Drawing Sheets

FUEL METERING SYSTEM

FIELD OF THE INVENTION

The present invention relates to fuel control systems, and more particularly, to fuel control systems for metering fuel flow to a plurality of fuel nozzles, such as in a gas turbine engine.

BACKGROUND OF THE INVENTION

In order to significantly reduce nitrogen oxide ($NO_x$) emissions from gas turbine engines, multiple combustion chambers are typically employed within the burner section of an engine. Fuel is introduced to each combustion chamber through one or more respective nozzles, and the sets of nozzles are typically referred to as pilot nozzles and main nozzles. At low fuel flow rates, fuel is fed only to one or more of the pilot nozzles, whereas at higher fuel flow rates, fuel is fed or staged to one or more main nozzles in addition to the pilot nozzles.

Fuel control systems are provided for metering the fuel flowing from fuel pumps to the fuel nozzles. Typically, the fuel pump is a positive-displacement type pump, in which the flow output of the pump is proportional to the pump speed. Because the fuel pump delivers more fuel to the engine than the fuel nozzles require, the fuel control system must bypass any fuel flow that is not delivered to the fuel nozzles back to the fuel pump.

One known system for metering fuel to two sets of nozzles is shown, for example, in U.S. Pat. No. 4,949,538 to Iasillo et al. In this system, a conventional flow metering unit (FMU) meters the total fuel flow required by the engine, and a downstream staging or splitter valve divides the total fuel flow, directing a portion to the pilot nozzles, and the remainder to the main nozzles. When a main nozzle is initially activated, at least a portion of the fuel flow to the corresponding pilot nozzle(s) is temporarily diverted to the main nozzle flow path until the main nozzle flow path is filled with fuel. As a result, although the fuel system is attempting to increase the flow of fuel to the combustion chambers, the overall flow of fuel to the combustion chambers is temporarily reduced. In an aircraft application, this condition is not acceptable.

This type of system also requires complicated logic in order to coordinate the operation of the metering valve of the FMU with the operation of the splitter valve. For example, when fuel flow is increased from a low flow to a higher flow level for staging the main fuel nozzles, the splitter valve must be actuated ahead of the metering valve, in order to prevent a portion of the fuel flow intended for the main nozzles from being delivered to the pilot nozzles during the transient. The pilot nozzles are typically not sized to handle any such relatively large flow, and therefore if fuel flow to the main nozzles were temporarily delivered to the pilot nozzles, a large pressure spike would occur. In similar fashion, when fuel flow is reduced from a relatively high level flowing to both pilot and main nozzles to a relatively low level flowing to only pilot nozzles, the splitter valve must be actuated ahead of the metering valve in order to prevent a flameout from occurring.

It is an object of the present invention to provide a fuel control system for metering fuel flow to at least two fuel nozzles that overcomes the drawbacks and disadvantages of prior art fuel control systems.

SUMMARY OF THE INVENTION

According to one aspect of the present invention, an apparatus for controlling fuel flow to at least two fuel nozzles, comprises a fuel inlet line coupled in fluid communication with a fuel pump for receiving fuel flowing from the fuel pump. A first metering valve is coupled in fluid communication with the fuel inlet line, and includes a first valve member mounted within the first metering valve, and the position of the first valve member is adjustable to adjust the flow rate of fuel through the first metering valve. A first fuel nozzle is coupled in fluid communication with the first metering valve for receiving the metered fuel flowing through the first metering valve. A second metering valve is also coupled in fluid communication with the fuel inlet line, and includes a second valve member mounted within the second metering valve. The position of the second valve member is adjustable in order to adjust the flow rate of fuel through the second metering valve. A second fuel nozzle is coupled in fluid communication with the second metering valve for receiving the metered fuel flowing through the second metering valve.

According to an aspect of the present invention, an apparatus of the foregoing type further comprises a pressure regulating valve coupled in fluid communication with the fuel inlet line, and with a downstream side of each of the first and second metering valves. The pressure regulating valve maintains a minimum pressure differential between the fuel inlet line and the downstream side of one of the first and second metering valves, whichever is at a higher pressure level. In one embodiment of the present invention, the pressure regulating valve includes an inlet port coupled in fluid communication with the fuel inlet line, an outlet port coupled in fluid communication with a return line, and a valve member mounted between the inlet and outlet ports for controlling the flow of fuel from the inlet line, through the inlet and outlet ports, and into the return line. In this embodiment of the present invention, a pressure line is coupled in fluid communication with the pressure regulating valve on the opposite side of the valve member relative to the inlet and outlet ports, and is also coupled in fluid communication with the downstream side of each of the first and second metering valves. The pressure line delivers fuel from one of the downstream sides of the metering valves to the pressure regulating valve, to thereby adjust the position of the valve member so as to maintain a substantially constant pressure differential between the fuel inlet line and the downstream side of the respective metering valve.

According to another aspect of the present invention, the first and second metering valves each include a metering valve member slidably received within the respective valve, and a pressure regulating valve member slidably received within the metering valve member. Each metering valve member defines a metering window, and the size of the metering window is adjustable by movement of the metering valve member in order to adjust the flow rate of fuel through the respective metering valve. Each pressure regulating valve member defines a pressure regulating window, and the size of the pressure regulating window is adjustable in order to maintain a substantially constant pressure drop across the respective metering valve.

According to another aspect of the present invention, the first and second metering valves each include a position sensor, and the position sensor is coupled to the respective metering valve member to transmit signals indicative of the position of the respective metering valve member. An engine electronic control unit is coupled to each position sensor, and a drive unit is coupled to the control unit and to each respective metering valve member in order to adjust the position of the respective metering valve member. The control unit is responsive to the signals transmitted by each position sensor to control operation of the respective drive unit, and thereby adjust the position of the respective metering valve member so as to control the flow rate of fuel through the respective metering valve.

One advantage of the present invention, is that the fuel flow paths to the separate sets of fuel nozzles, such as the pilot nozzles and the main nozzles in a gas turbine engine, are controlled and metered independently relative to each other. Accordingly, there is no interruption of fuel flow to the pilot nozzles, for example, when the main nozzles are initially opened. Yet another advantage of the present invention, is that it is unnecessary to coordinate operation of the pilot and main metering valves, for example, in order to prevent pressure spikes and/or flameouts.

Other advantages of the present invention will become apparent in view of the following detailed description and accompanying drawings.

DETAILED DESCRIPTION OF THE PREFERRED EMBODIMENT

Figure 1:
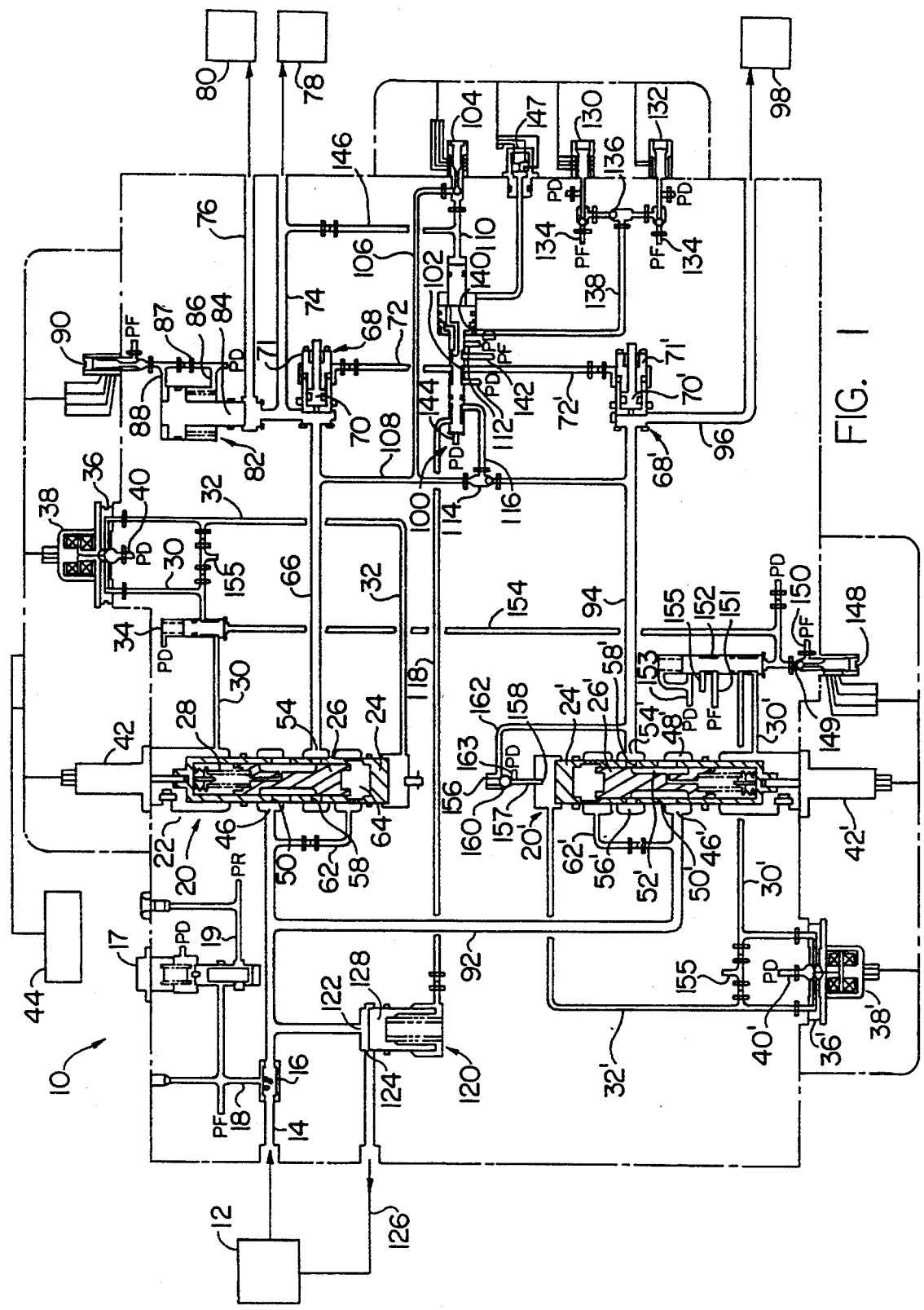
FIG. 1 is a simplified schematic illustration of a fuel control system embodying the present invention for controlling fuel flow to a plurality of fuel nozzles.

In FIG. 1, a fuel control system embodying the present invention is indicated generally by the reference numeral 10. A fuel pump 12 is coupled to one end of a primary fuel inlet line 14. In the embodiment of the present invention illustrated, the fuel pump 12 is a positive-displacement type pump, which runs at engine speed. The greater the engine speed, the greater is the flow output of the pump, and vice-versa. It is noted, however, that other types of fuel pumps may be employed with the control system of the present invention.

A servo filter 16 is tapped into the primary fuel inlet line 14, and is in turn coupled to one end of a filtered high pressure (PF) fuel line 18. The high pressure fuel line 18 is coupled in fluid communication with various servo-driven components of the fuel control system in order to provide a filtered, relatively high pressure source of fuel (PF) to these components, as is described further below. The servo filter 16 filters the fuel flowing into the fuel line 18 to remove any particulates that might otherwise interfere with operation of various servo-driven components of the system 10. A pressure-regulating valve 17 is coupled in fluid communication with the fuel line 18, and includes an outlet port coupled to a regulated pressure (PR) line 19 for regulating the pressure of the filtered fuel so that it is maintained at a substantially constant pressure differential above the system drain (PD). The pressure regulating valve 17 is of a type known to those skilled in the art, and includes a spring-biased valve member, the backside of which is coupled to the system drain (PD) for maintaining the fuel flowing through the valve at a substantially constant pressure differential over the pressure of the system drain (PD). The regulated fuel flowing through the line 19 is used to operate various servo-driven components of the system 10.

Figure 2:
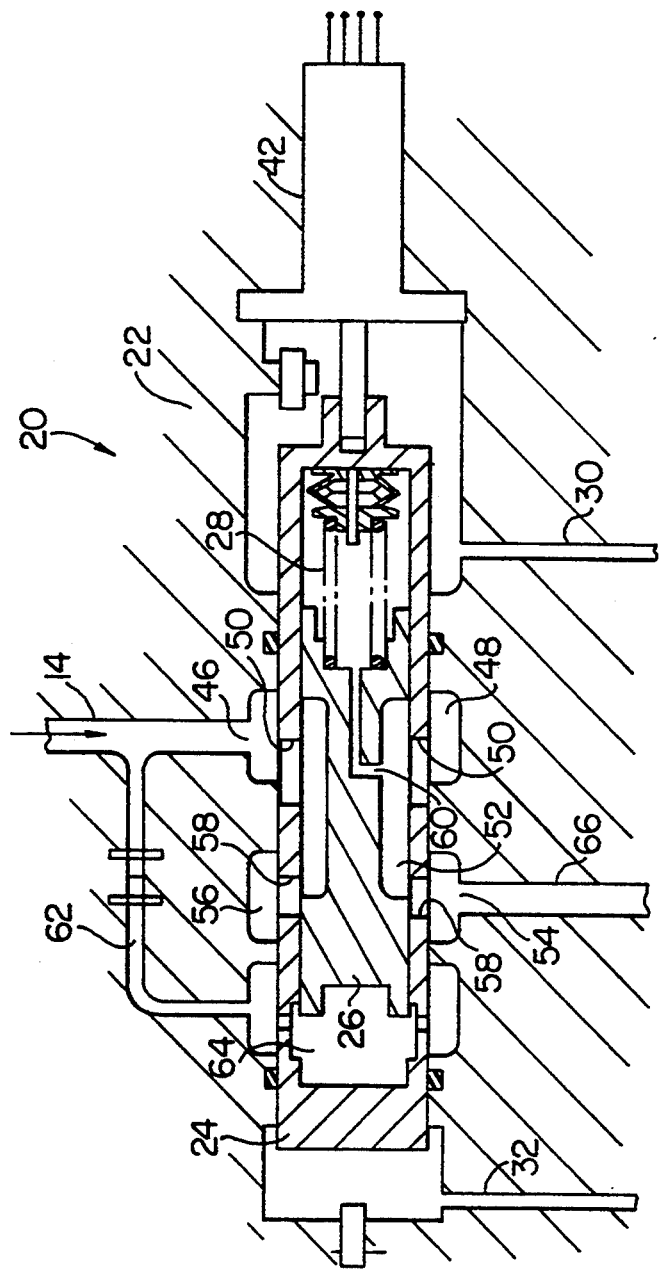
FIG. 2 is an enlarged schematic illustration of the coaxial metering and pressure regulating valve (CMPRV) for the pilot nozzles of the control system of FIG. 1.

The other end of the primary fuel inlet line 14 is coupled to a first or pilot coaxial metering and pressure regulating valve (CMPRV) 20, which is illustrated in further detail in FIG. 2. The CMPRV 20 includes a metering valve (MV) for metering fuel flow, and an in-line pressure regulating valve (PRV) which maintains a substantially constant pressure drop across the metering valve, and thus permits precise control of the fuel flow rate by the metering valve. Certain features of this type of valve, and their manner of operation are disclosed in U.S. Pat. No. 4,449,548 to Tutherly, which is assigned to the same assignee as is the present invention, and is hereby expressly incorporated by reference as part of the present disclosure.

The CMPRV 20 includes a housing 22 defining a hollow interior, and a metering valve (MV) member 24 slidably received within the hollow interior. The metering valve member 24 also defines a hollow interior, and a pressure-regulating valve (PRV) member 26 is slidably received within the hollow interior of the metering valve member 24. A spring member 28, illustrated in dashed lines in FIGS. 1 and 2, is seated between one end of the pressure-regulating valve member 26 and an inside wall of the metering valve member 24 for normally biasing the pressure-regulating valve member 24 toward the opposite end of metering valve member.

A first pressure line 30 is coupled in fluid communication with the hollow interior of the housing 22 on one end of the metering valve member 24, and a second pressure line 32 is coupled in fluid communication with the hollow interior on the other end of the metering valve member, as shown in FIGS. 1 and 2. The other end of the first pressure line 30 is coupled through a pilot over-speed valve 34 to one side of a flapper system 36, which is driven by a double-acting torque motor 38, as shown in FIG. 1. The other end of the second pressure line 32 is coupled to the other side of the flapper system 36 relative to the first pressure line 30. The flapper system is also coupled to a low pressure source, such as the system drain (PD), through a low pressure line 40.

Depending on the position of the flapper system 36, which is controlled by operation of the torque motor 38, the pressure differential between the lines 30 and 32, and thus between the ends of the metering valve member 24, can be manipulated. By manipulating the pressure differential between the first and second pressure lines 30 and 32, respectively, the position of the metering valve member 24 can be axially manipulated within the housing 22 to control the rate of fuel flow through the CMPRV 20, as is described further below.

A linear variable displacement transducer (LVDT) 42 is coupled to the metering valve member 24, and transmits signals to an engine electronic control unit (EEC) 44 indicative of the axial position of the metering valve member. The EEC 44 is coupled to the torque motor 38, and is responsive to the signals transmitted by the LVDT 42 to control the torque motor in order to drive the flapper system 36. The flapper system 36 is controlled to in turn adjust the pressure differential between the first and second pressure lines 30 and 32, so as to control the axial position of the metering valve member 24, and thus control the flow rate of fuel through the CMPRV 20.

The CMPRV 20 defines an inlet port 46 coupled to the other end of the main fuel inlet line 14, and a first annular passageway 48 between the metering valve member 24 and the housing 22 coupled in fluid communication with the inlet port, as shown in FIG. 2. The metering valve member 24 defines a main metering window 50 extending through the wall of the metering valve member, and coupled in fluid communication with the first annular passageway 48 to receive fuel flowing there through. The pressure-regulating valve member 26 defines an annular recess forming a second annular passageway 52 within the metering valve member 24, and coupled in fluid communication with the main metering window 50.

The CMPRV 20 also includes an outlet port 54 coupled in fluid communication with a third annular passageway 56 formed between the metering valve member 24 and the housing 22, and a pressure regulating valve (PRV) window 58 is formed through the wall of the metering valve member 24 and coupled in fluid communication with the third annular passageway 56.

A low pressure passageway 60 is formed within the pressure-regulating valve member 26, and extends between the second annular passageway 52 and the chamber receiving the spring member 28 to receive relatively low pressure fuel within the chamber, A high pressure line 62 is coupled in fluid communication between the primary fuel inlet line 14, and a chamber 64 formed between the respective end of the pressure-regulating valve member 26 and the metering valve member 24. The pressure applied by the spring member 28 in combination with the pressure of the relatively low pressure fuel on the same side of the PRV member 26, is substantially equal to the pressure introduced through the high pressure line 62, and into the chamber 64 on the opposite side of the PRV member 26, thus maintaining a substantially constant pressure drop across the CMPRV 20.

Fuel flowing through the inlet port 46, flows into the annular passageway 48, and in turn through the metering window 50. The metered fuel then flows through the annular passageway 52, through the PRV window 58, through the annular passageway 56, and through the outlet port 54. The outlet port 54 is coupled to one end of a pilot metered fuel line 66 for delivering the metered fuel to the pilot nozzles, as is described further below.

As can be seen, the CMPRV 20 automatically adjusts the position of the PRV member 26, and thus the area of the PRV window 58 in order to maintain a substantially constant pressure drop across the valve. Because the pressure drop is maintained substantially constant, the fuel flow rate through the CMPRV 20 can be precisely adjusted by controlling the torque motor 38 based on the signals transmitted by the LVDT 42, to in turn adjust the axial position of the metering valve member 24, and thus the area of the metering window 50. The greater the area of the metering window 50, the greater is the flow of fuel through the CMPRV 20, and vice-versa.

As shown in FIG. 1, the other end of the pilot metered fuel line 66 is coupled to a minimum pressure and shut-off valve (MPSOV) 68. The MPSOV 68 includes a valve member 70 seated between the inlet port and the outlet port of the valve, and a spring member 71 which normally biases the valve member in the closed position to shut off flow through the valve. A pressure line 72 is coupled to the backside of the MPSOV 68 in order to control the operation of the valve. When low pressure fuel (PD) is introduced through the pressure line 72, the pressure in the pilot metered fuel line 66 must be raised to a level substantially equal to the pressure of the spring member 71 in combination with the relatively low pressure fuel applied to the valve member 70, before the valve member 70 will open and permit fuel to flow through the MPSOV 68. On the other hand, when high pressure fuel (PF) is introduced into the pressure line 72, the spring-biased valve member 70 is driven into a closed position, and provides drop tight sealing, preventing the metered fuel from flowing through the MPSOV, as is described further below.

A first pilot line 74 and a second pilot line 76 are each coupled in fluid communication with the outlet port of the MPSOV 68 to receive the metered fuel flowing there through. The other end of the first pilot line 74 is coupled to a first set of pilot nozzles 78, and the other end of the second pilot line 76 is coupled to a second set of pilot nozzles A shut-off valve (SOV) 82 is coupled between the second pilot line 76 and the outlet port of the MPSOV 68 to control the flow of metered fuel to the second set of pilot nozzles 80. As shown in FIG. 1, the SOV 82 includes a spring-biased valve member 84 normally biased in the open position to permit metered fuel to flow into the second pilot line 76. A low pressure line 86 is coupled in fluid communication with the SOV 82 on the spring side of the valve member 84, and a signal pressure line 88 is coupled in fluid communication with the SOV on the opposite side of the valve member. The low pressure line 86 is coupled to a low pressure source of fuel, such as a system drain (PD), and the signal pressure line 88 is coupled to the low pressure line 86 through an orifice 87. A solenoid valve 90 is coupled between the signal pressure line 88 and the high pressure source (PF) to control the pressure of fuel in the line. The EEC 44 is coupled to the solenoid valve 90 to control actuation of the valve. In the open position of the solenoid valve 90, high pressure fuel (PF) flows through the high pressure line 88, and in turn drives the valve member 84 shut, and closes the SOV 82, preventing the flow of metered fuel through the second pilot line 76. In the closed position of the solenoid valve 90, on the other hand, low pressure fuel (PD) flows to the signal pressure line 88, so that the spring maintains the SOV 82 open, which permits metered fuel to flow through the second pilot line 76 to the second set of pilot nozzles 80.

A main fuel inlet line 92 is coupled between the primary fuel inlet line 14 and a second or main coaxial metering and pressure regulating valve (CMPRV) 20'. While the first CMPRV 20 meters the fuel flow to the pilot nozzles 78 and 80, the second CMPRV 20' meters the fuel flow to a set of main fuel nozzles, as is described further below. The second CMPRV 20' is identical to the first CMPRV 20, and therefore like reference numerals designated by a prime symbol (') are used to indicate like elements.

An LVDT 42' transmits signals to the EEC 44 indicative of the axial position of the MV member 24'. The EEC 44 in turn controls the double-acting torque motor 38' to drive the flapper system 36' so as to control the position of the MV member 24' and thus the area of the metering window 50', in order to control the flow rate of fuel through the CMPRV 20'. The fuel flowing through the main fuel inlet line 92 flows through the inlet port 46' of the CMPRV 20', through the annular passageway 48', and in turn through the metering window 50'. The metered fuel then flows through the annular passageway 52', through the PRV window 58', through the annular passageway 56', and through the outlet port 54'. The outlet port 54' is coupled to one end of a first main metered fuel line 94 for delivering the metered fuel to the main nozzles, as is described further below.

As with the pilot CMPRV 20, the main CMPRV 20' automatically adjusts the position of the PRV member 26', and thus the area of the PRV window 58' in order to maintain a substantially constant pressure drop across the valve. Because the pressure drop is maintained substantially constant, the fuel flow rate through the CMPRV 20' is precisely adjusted by controlling the torque motor 38' based on the signals transmitted by the LVDT 42', to in turn adjust the axial position of the metering valve member 24', and thus the area of the metering window 50'. The greater the area of the metering window 50', the greater is the flow rate of fuel through the CMPRV 20', and vice-versa.

The other end of the first main metered fuel line 94 is coupled to a minimum pressure and shut-off valve (MPSOV) 68'. The MPSOV 68' is identical to the MPSOV 68, and therefore like reference numerals designated with the prime symbol (') are used to indicate like elements. When low pressure fuel (PD) is introduced through the pressure line 72', the pressure in the first main metered fuel line 94 must be raised to a level at least substantially equal to the pressure of the spring member 71' in combination with the relatively low pressure fuel applied to the valve member 70', before the valve member 70' will open and permit fuel to flow through the MPSOV 68'. On the other hand, when high pressure fuel (PF) is introduced into the pressure line 72', the spring-biased valve member 70' is driven into a closed position, and provides drop tight sealing, preventing the fuel from flowing through the MPSOV, as is described further below. The MPSOV 68' thus maintains a minimum fuel pressure for proper operation of the control system servos and actuators, and when the control system is shut down, it provides drop-tight sealing. A second main metered fuel line 96 is coupled on one end to the outlet port of the MPSOV 68', and is coupled on the other end to a set of main fuel nozzles 98 for delivering the metered fuel to the main nozzles.

The control system 10 includes a solenoid actuated sequence valve 100 for controlling the start and shut-down of the engine. The solenoid actuated sequence valve 100 is of a known type, an example of which is disclosed in U.S. Pat. No. 5,114,115 to Gillott, which is assigned to the same assignee as is the present invention, and is hereby expressly incorporated by reference as part of the present disclosure, The sequence valve 100 defines a hollow interior, and includes an axially-elongated valve member 102 received within the hollow interior. The axial position of the valve member 102 is adjusted by selectively actuating the associated solenoid valves, in order to control the flow of fuel through the sequence valve, as is described further below.

A start and vapor vent solenoid valve 104 is electrically coupled to the EEC 44 to control actuation of the valve in response to signals transmitted by the EEC. An inlet port of the start solenoid valve 104 is coupled to one end of a high pressure line 106, the other end of which is coupled to another high pressure line 108. The high pressure line 108 is coupled between the pilot metered fuel line 66 and the first main metered fuel line 94, and delivers relatively high pressure fuel from the main pilot fuel line to the start solenoid valve 104.

The outlet port of the start solenoid valve 104 is coupled to a first control port 110 of the sequence valve 100. When the EEC 44 actuates the start solenoid valve 104 into the open position, relatively high pressure fuel from the line 106 is delivered through the solenoid valve and into the first control port 110 of the sequence valve. If there is vapor in the fuel, the vapor can vent into a vent line 146, which is coupled on one end between the start solenoid valve 104 and the first control port 110, and coupled on the other end to the first pilot line 74. The relatively high pressure fuel delivered through the first control port 110 drives the valve member 102 into a run position (to the left in FIG. 1), which connects the pressure lines 72 and 72' to low pressure lines 112, each coupled on one end to the sequence valve 100 and coupled on the other end to the system low pressure source (PD), such as the system drain. Accordingly, in the run position of the sequence valve 100, low pressure fuel is delivered to the backside of the MPSOV 68 to open the valve, and permit fuel to flow to the pilot nozzles 78 and/or 80, and low pressure fuel is also delivered to the backside of the MPSOV 68' to open the respective valve, and permit fuel to flow to the main nozzles 98.

A most selector valve 114 is coupled within the line 108 between the pilot metered fuel line 66 and the first main metered fuel line 94, and is also coupled to one end of an outlet line 116, the other end of which is coupled to the sequence valve 100. Depending upon which pressure is higher, the pressure in the pilot metered fuel line 66, or the pressure in the first main metered fuel line 94, the most selector valve 114 directs the fuel flowing from the higher pressure line to the sequence valve, and blocks the flow of fuel from the lower pressure line to the sequence valve.

The sequence valve 100 is also coupled to one end of a pressure line 118, the other end of which is coupled to the backside of a control pressure regulating valve (CPRV) 120. The CPRV 120 is a bypass type regulator that returns pump flow not required by the engine to the fuel pump 12. When the sequence valve 100 is in the run position, the CPRV 120 senses the downstream pressure of each of the two CMPRVs 20 and 20' through the most selector valve 114, and then regulates the pressure in the primary fuel inlet line 14 (the fuel pump output pressure) at a substantially constant level above the highest downstream pressure. The CPRV 120 thus ensures that the fuel pressure in the primary fuel inlet line 14 is sufficient for proper operation of the two CMPRVs 20 and 20'. The CPRV 120 includes an inlet port 122 coupled to the primary fuel inlet line 14, an outlet port 124 coupled to a return line 126 for delivering excess fuel to the fuel pump 12, and a spring-biased valve member 128 seated between the inlet and outlet ports. The CPRV 120 maintains a minimum pressure differential between the fuel flowing through the primary fuel inlet line 14 and the fuel flowing through either the pilot metered fuel line 66 or the first main metered fuel line 94, whichever is higher. This minimum pressure differential is substantially constant, and is approximately equal to the pressure applied by the spring of the spring-biased valve member 128.

An EEC shut-down solenoid valve 130 and an airframe shut-down solenoid valve 132 are each provided for purposes of terminating engine fuel flow. The EEC solenoid valve 130 is coupled to the EEC 44, which transmits signals to the solenoid valve to control its actuation, The airframe solenoid valve 132 is coupled to a control switch (not shown) accessible by the pilot in the cockpit of an aircraft, for example, to control actuation of the solenoid. In the closed position, each shut-down solenoid valve 130 and 132 is coupled to the low pressure source, such as the system drain (PD), as illustrated in FIG. 1. The inlet port of each shut-down solenoid valve 130 and 132 is coupled to a respective high pressure line 134 for receiving high pressure fuel (PF) from the high pressure line 18, and the outlet port of each shut-down solenoid is coupled to a most selector valve 136. The outlet port of the most selector valve 136 is coupled to one end of a signal pressure line 138, the other end of which is coupled to a second control port 140 of the sequence valve 100 located on the spring side of the valve member 102.

Actuation of either shut-down valve 130 or 132 directs the flow of high pressure fuel (PF) from the respective high pressure line 134, through the most selector valve 136 (which simultaneously blocks the flow path from the other shut-down valve), and into the second control port 140 of the sequence valve 100. The relative high pressure fuel (PF) drives the valve member 102 of the sequence valve 100 into a shut-down position (to the right in FIG. 1), which couples the pressure lines 72 and 72' in fluid communication with a high pressure line 142, which is in turn coupled to the high pressure line 18 to receive relatively high pressure fuel (PF). Accordingly, the high pressure fuel (PF) is delivered through the pressure lines 72 and 72', which in turn drives the respective valve members 70 and 70' of the MPSOVs 68 and 68' into the closed positions, to stop the flow of fuel to the pilot and main nozzles. Also in the shut-down position of the sequence valve 100, a low pressure line 144 is coupled through the sequence valve to the line 118, which directs low pressure fuel (PD), such as from the system drain, to the backside of the CPRV 120. This in turn further opens the CPRV 120, and permits the fuel flowing into the primary fuel inlet line 14 to flow back to the fuel pump 12 through the return line 126.

A fuel shut-off indicator 147 is coupled to the sequence valve 100 on the same side of the valve member 102 as the first control port 110, in order to sense the fuel pressure within the first control port, and transmit signals to the EEC 44 indicative thereof. As described above, a low pressure signal indicates that the sequence valve 100 is in the shut-down position, whereas a high pressure signal indicates that the sequence valve is in the run position.

The control system 10 also includes over-speed protection so that if the engine is spinning too fast, the fuel supply can be metered down to slow the engine. An over-speed solenoid 148 is coupled to the EEC 44 to control actuation of the valve, and includes an inlet port 150 coupled to the high pressure line 18 to receive relatively high pressure fuel (PF). The over-speed solenoid 148 also includes an outlet port 149 coupled to an inlet port of a main over-speed valve 152, and also coupled to one end of a pilot over-speed line 154, the other end of which is coupled to an inlet port of the pilot over-speed valve 34.

The EEC 44 continuously monitors the engine speed, and if the engine speed exceeds a maximum level, the EEC opens the over-speed solenoid valve 148, which in turn delivers high pressure fuel (PF) from the inlet port 150 to the inlet port of the main over-speed valve 152, and to the inlet port of the pilot over-speed valve 34. Each over-speed valve 34 and 152 is a sequence type valve, including a spring-biased, axially-movable valve member slidably received within a hollow interior of the valve. When the high pressure fuel is introduced through the inlet ports of the over-speed valves, each valve member is driven into a shutdown position against its spring. In the shutdown positions, high pressure fuel (PF) is delivered to the first pressure lines 30 and 30', which in turn drives the MV members 24 and 24' into closed positions, closing the metering windows 50 and 50', and terminating the flow of fuel through the CMPRVs 20 and 20'.

When the EEC 44 closes the over-speed solenoid valve 148, on the other hand, only low pressure fuel (PD) from the system drain is delivered to the inlet ports of the main and pilot over-speed valves 152 and 34, respectively. This in turn permits the spring-biased valve members of the over-speed valves 34 and 152 to be driven into the run positions, opening the metering windows 50 and 50', and permitting the flow of fuel through the CMPRVs 20 and 20'.

The main over-speed valve 152 is also coupled between a high pressure line 151, which receives high pressure fuel (PF) from the line 18, and a low pressure line 153 (PD) coupled to the system drain. A control line 155 is coupled on one end to the main over-speed valve 152, and includes a first branch coupled between the pressure lines 30 and 32 for the pilot flapper system 36, and a second branch coupled between the pressure lines 30' and 32' for the main flapper system 36'. In the run position of the main over-speed valve 152, relatively high pressure fuel (PF) is delivered from the line 151 to the line 155, and in turn to the main pressure lines 30' and 32' and to the pilot pressure lines 30 and 32 for controlling the CMPRVs 20 and 20'. In the shut-down position of the main over-speed valve 152, on the other hand, the high pressure line 151 is closed, and the control line 155 is coupled to the line 153, and thus to the system drain (PD). The pressure lines 32 and 32' are each then coupled to the system drain, permitting the MV member 24' of the main CMPRV 20' to move upward in FIG. 1, and the MV member 24 of the pilot CMPRV 20 to move downward in FIG. 1, in order to shut down each CMPRV.

A shut-off valve 156 is coupled through a first port 157 to one end of the main CMPRV 20', and includes a movable valve member 158 extending through the first port. The valve member 158 defines a free end projecting into the main CMPRV 20' adjacent one end of the MV member 24', and an expanded portion 160 on its other end. The shut-off valve 156 also includes a second port 161 coupled to one end of a line 162, the other end of which is coupled to the main metered fuel line 94. A low pressure line 164 is coupled to the first port 157 for connecting the line 162 to the system drain (PD) when the valve 160 is open, as is described further below.

When the main CMPRV 20' is in the closed position, the MV member 24' is moved upward in FIG. 1 into engagement with the free end of the valve member 158, which in turn moves the valve member so as to lift the expanded portion 160 off of its valve seat, and couple the line 162 in fluid communication with the line 163 and the system drain (PD). The main metered fuel line 94 is then coupled in fluid communication with the system drain, which causes closure of the MPSOV 68', and prevents any fuel flow to the main fuel nozzles 98. If any fuel from the main fuel inlet line leaks through the CMPRV 20' when it is in the closed position into the main metered fuel line 94, the leaking fuel is permitted to flow through the line 162 to the system drain. When the CMPRV 20' is in an open position, on the other hand, the MV member 24' is moved downward in FIG. 1 away from the valve member 158, thus closing the shut-off valve 156 and line 162, and directing metered fuel through the main metered fuel line 94 and MPSOV 68' to the main fuel nozzles 98.

In the operation of the above-described fuel control system of the present invention, the EEC 44 starts the engine by opening the start solenoid 104, which latches the sequence valve 100 in the run position. This in turn delivers low pressure fuel (PD) to the backside of each MPSOV 68 and 68', which opens the MPSOVs and permits fuel to flow to the pilots and main nozzles 78, 80 and 98. Relatively high pressure fuel is also delivered to the backside of the CPRV 120 from either the pilot metered fuel line 66 or the main metered fuel line 94, whichever is at a higher pressure, in order to maintain a sufficient pressure differential between the primary fuel inlet line 14 and the downstream fuel lines for operation of the CMPRVs. The EEC 44 then controls operation of the torque motors 38 and 38', based on the signals transmitted by the corresponding LVDTs 42 and 42', to precisely meter the fuel flow through the respective CMPRVs 20 and 20'.

In order to direct fuel flow to one or both pilot nozzles only, and shut down the main fuel nozzles 98, the EEC 44 closes the main CMPRV 20' by operation of the torque motor 38'. This in turn drives the MV member 26' upward in FIG. 1, which opens the shut-off valve 156, couples the main metered fuel line 94 to the system drain (PD), and closes the MPSOV 68', preventing fuel flow to the main fuel nozzles 98 and directing metered flow to the pilot nozzles only.

To shut down the fuel flow to all nozzles of the engine, either the EEC 44 opens the EEC shut-down solenoid valve 130, or the pilot of the aircrafts, for example, opens the airframe solenoid valve 132. Actuation of either shut-down solenoid valve 130 or 132 delivers high pressure fuel (PF) to the second control inlet 140 of the sequence valve 100, which drives the valve member 102 into the shut-down position. This in turn delivers high pressure fuel (PF) to the backsides of the MPSOVs 68 and 68', which closes the MPSOVs and prevents any further fuel flow to the pilot or main nozzles 78, 80 and 98. Low pressure fuel (PD) is also then delivered to the backside of the CPRV 120, which in turn permits the fuel flowing into the fuel inlet line 14 to return through the return line 126.

One advantage of the fuel control system of the present invention, is that the fuel flow paths to the pilot nozzles and to the main nozzles are each controlled and metered independently relative to each other. Accordingly, there is no interruption of fuel flow to the pilot nozzles when the main nozzles are initially opened, as is the case with the type of prior art fuel control system described above. The main fuel inlet line 92 is primed with fuel prior to opening the main CMPRV 20', and therefore when the main CMPRV 20' is initially opened, fuel is not temporarily diverted from the pilot flow path. Yet another advantage of the present inventions is that because the flow path for the pilot nozzles are metered independently of the flow path for the main nozzles, it is unnecessary to coordinate the operation of the pilot and main metering valves in order to prevent pressure spikes or flameouts, as is also the case with the type of prior art fuel control system described above.

As will be recognized by those skilled in the pertinent art, numerous modifications may be made to the above-described fuel control system without departing from the scope of the present invention as defined in the appended claims. For example, although the system described above includes two metered fuel flow outputs, additional flow paths may be added by adding additional CMPRVs, for example, as described above. In addition, other types of valves and hydraulic components may equally be employed in the control system of the present invention which perform the necessary functions of the components described above.

What is claimed is:

1. An apparatus for controlling fuel flow to at least two fuel nozzles, comprising:
   a fuel inlet line coupled in fluid communication with a fuel pump for receiving fuel flowing from the fuel pump;
   a first metering valve coupled in fluid communication with the fuel inlet line and including a first valve member mounted within the first metering valve, the position of the first valve member being adjustable to adjust the flow rate of fuel through the first metering valve;
   a first fuel nozzle coupled in fluid communication with the first metering valve for receiving the metered fuel flowing through the first metering valve;
   a second metering valve coupled in fluid communication with the fuel inlet line and including a second valve member mounted within the second metering valve, the position of the second valve member being adjustable to adjust the flow rate of fuel through the second metering valve;
   a second fuel nozzle coupled in fluid communication with the second metering valve for receiving the metered fuel flowing through the second metering valve; and
   a pressure regulating valve coupled in fluid communication with the fuel inlet line, and coupled in fluid communication with a downstream side of at least one of the first and second metering valves for maintaining a minimum pressure differential between the fuel inlet line and the downstream side of the at least one of the first and second metering valves.

2. An apparatus as defined in claim 1, wherein the pressure regulating valve includes an inlet port coupled in fluid communication with the fuel inlet line, an outlet port coupled in fluid communication with a return line, and a valve member mounted between the inlet and outlet ports for controlling the flow of fuel from the inlet line, through the inlet and outlet ports, and into the return line.

3. An apparatus as defined in claim 2, further comprising a pressure line coupled in fluid communication with the pressure regulating valve on the opposite side of the valve member relative to the inlet and outlet ports, and coupled in fluid communication with the downstream side of each of the first and second metering valves for delivering fuel from one of the downstream sides of the metering valves to the pressure regulating valve, to thereby adjust the position of the valve member and maintain a substantially constant pressure differential between the fuel inlet line and the downstream side of the respective metering valve.

4. An apparatus as defined in claim 1, wherein at least one of the first and second metering valves includes a pressure regulating valve member maintaining a substantially constant pressure drop across the respective metering valve.

5. An apparatus as defined in claim 1, wherein at least one of the first and second valve members is a metering valve member slidably received within the respective valve, and the respective valve further includes a pressure regulating valve member slidably received within the metering valve member, and wherein the metering valve member defines a metering window, the size of the metering window being adjustable upon movement of the metering valve member to adjust the flow rate of fuel through the respective metering valve, and the pressure regulating valve member defines a pressure regulating window, the size of the pressure regulating window being adjustable to maintain a substantially constant pressure drop across the respective metering valve.

6. An apparatus as defined in claim 1, wherein at least one of the first and second metering valves includes a position sensor, the position sensor being coupled to the respective valve member to transmit signals indicative of the position of the respective valve member.

7. An apparatus as defined in claim 6, further comprising a control unit coupled to the respective position sensor, and a drive unit coupled to the control unit and to the respective valve member for adjusting the position of the valve member, the control unit being responsive to the signals transmitted by the position sensor to control operation of the drive unit, and thereby adjust the position of the respective valve member to control the flow rate of fuel through the respective metering valve.

8. An apparatus as defined in claim 1, further comprising a first shut-off valve coupled between the first metering valve and the first fuel nozzle, and a second shut-off valve coupled between the second metering valve and the second fuel nozzle, each shut-off valve controlling the flow of metered fuel to the respective fuel nozzle.

9. An apparatus as defined in claim 8, wherein each shut-off valve includes means for maintaining the metered fuel flowing between the respective metering valve and the fuel nozzle at a minimum pressure level.

10. An apparatus as defined in claim 9, wherein the means for maintaining a minimum pressure level includes a biased valve member mounted within each shut-off valve, the biased valve member closing the respective shut-off valve in response to the pressure of the metered fuel flowing through the respective valve dropping below a minimum value.

11. An apparatus as defined in claim 8, further comprising a sequence valve coupled in fluid communication with the first and second shut-off valves, for controlling actuation of each shut-off valve.

12. An apparatus as defined in claim 1, wherein the apparatus is provided for controlling fuel flow to at least two fuel nozzles of a gas turbine engine, and further includes first means for monitoring the speed of the engine, and second means responsive to the first means for reducing the flow of fuel to the fuel nozzles when the engine speed exceeds a predetermined value.

13. An apparatus as defined in claim 12, wherein the second means includes a first over-speed valve coupled between a relatively high pressure source of fuel and the first metering valve, the first valve member being responsive to the flow of high pressure fuel from the first over-speed valve to move from an open position to a closed position to prevent the flow of fuel through the first metering valve.

14. An apparatus as defined in claim 12, wherein the second means includes an over-speed valve coupled between a relatively high pressure source of fuel and the second metering valve, the second valve member being responsive to the flow of high pressure fuel from the over-speed valve to move from an open position to a closed position to prevent the flow of fuel through the second metering valve.

15. An apparatus for controlling fuel flow to at least two fuel nozzles, comprising:
a fuel inlet line coupled in fluid communication with a fuel pump for receiving fuel;
first means coupled in fluid communication between the fuel inlet line and at least one first fuel nozzle for metering the flow of fuel from the fuel inlet line to the at least one first fuel nozzle;
second means coupled in fluid communication with the fuel inlet line and at least one second fuel nozzle for metering the flow of fuel from the fuel inlet line to the at least one second fuel nozzle; and
means coupled in fluid communication with the fuel inlet line and it downstream side of at least one of the first and second means for maintaining a minimum pressure differential between the fuel inlet line and the downstream side of the at least one of the first and second means.

16. An apparatus as defined in claim 15, further including third means for regulating the pressure of the fuel flowing through the first means, and maintaining a substantially constant pressure drop across the first means.

17. An apparatus as defined in claim 16, wherein the first means includes a first metering valve including a first metering valve member, the position of the first metering valve member being adjustable to adjust the flow rate of fuel through the first metering valve, and wherein the third means includes a first pressure regulating valve member received within the first metering valve member and maintaining a substantially constant pressure drop across the first metering valve.

18. An apparatus as defined in claim 15, further including means for regulating the pressure of the fuel flowing through the second means, and maintaining a substantially constant pressure drop across the second means.

19. An apparatus as defined in claim 18, wherein the second means includes a metering valve including a metering valve member, the position of the metering valve member being adjustable to adjust the flow rate of fuel through the metering valve, and wherein the means for regulating the pressure includes a pressure regulating valve member received within the metering valve member for maintaining a substantially constant pressure drop across the metering valve.

20. An apparatus as defined in claim 17, wherein the first metering valve member defines a first metering window, the area of the first metering window being adjustable by adjusting the position of the first metering valve member within the first metering valve to adjust the flow rate of fuel through the first metering window, and wherein the first pressure regulating member defines a pressure regulating window, the area of the first pressure regulating window being adjustable by movement of the first pressure regulating member relative to the first metering valve member to maintain a substantially constant pressure drop across the first metering valve.

21. An apparatus as defined in claim 19, wherein the metering valve member defines a metering window, the area of the metering window being adjustable by adjusting the position of the metering valve member within the metering valve to adjust the flow rate of fuel through the metering window, and wherein the pressure regulating member defines a pressure regulating window, the area of the pressure regulating window being adjustable by movement of the pressure regulating member relative to the metering valve member to maintain a substantially constant pressure drop across the metering valve.

22. An apparatus as defined in claim 15, further comprising a first over-speed valve coupled between a relatively high pressure source of fuel and the first means, the first means being responsive to the flow of high pressure fuel from the first over-speed valve to move from an open position to a closed position to prevent the flow of fuel through the first means.

23. An apparatus as defined in claim 15, further comprising an over-speed valve coupled between a relatively high pressure source of fuel and the second means, the second means being responsive to the flow of high pressure fuel from the over-speed valve to move from an open position to a closed position to prevent the flow of fuel through the second means.

* * * * *